J. S. GAGE.
Grain-Drill.
No. 29,071.
Patented July 10, 1860.
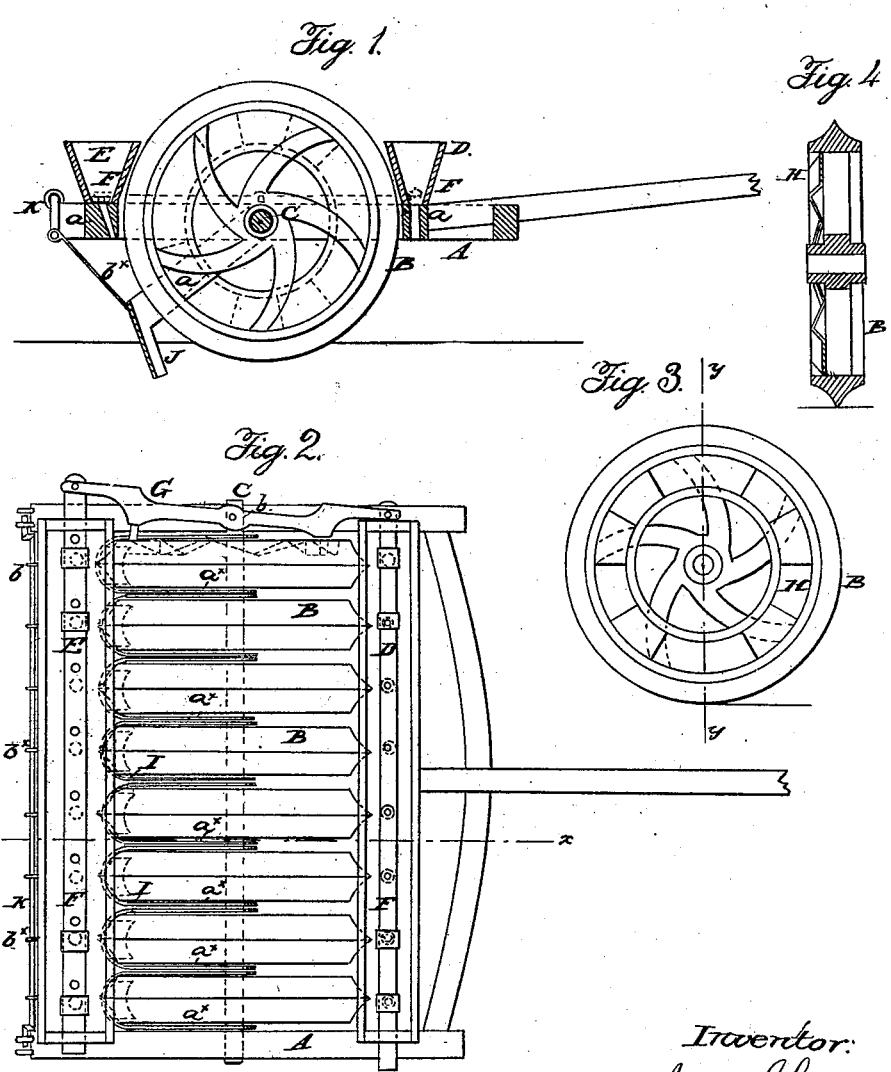
Witnesses:
J. W. Coombly
R. S. Spencer
Inventor:
John S. Gage
per Munn
Attorney

UNITED STATES PATENT OFFICE.

JOHN S. GAGE, OF DOWAGIAC, MICHIGAN.

IMPROVEMENT IN SEEDING-MACHINES.

Specification forming part of Letters Patent No. 29,071, dated July 10, 1860.

*To all whom it may concern:*

Be it known that I, JOHN S. GAGE, of Dowagiac, in the county of Cass and State of Michigan, have invented a new and Improved Seeding-Machine; and I do hereby declare that the following is a full, clear, and exact description of the same, reference being had to the annexed drawings, making a part of this specification, in which—

Figure 1 is a side sectional view of my invention, taken in the line $x\,x$, Fig. 2; Fig. 2, a plan or top view of the same; Fig. 3, a side view of a cam-roller of the same; Fig. 4, a section of the same, taken in the line $y\,y$, Fig. 3.

Similar letters of reference indicate corresponding parts in the several figures.

This invention consists in a novel and improved arrangement of seed-distributing device, rollers, and coverers, substantially as hereinafter described, whereby the seed may be planted and covered and the ground rolled and left in a better state than hitherto for the growth of the crop.

To enable those skilled in the art to fully understand and construct my invention, I will proceed to describe its construction and operation.

A represents a rectangular frame, which is mounted on a series of rollers, B, said rollers being of cast-iron, having V-shaped peripheries, and placed loosely on an axle, C, which is secured permanently in the frame A. The rollers B may be of any proper diameter and width, according to the size of the machine.

On the front part of the frame A, in front of the rollers, there is placed a seed-box, D, and a similar box, E, is placed on the back part of the frame A, behind the rollers. Both these boxes D E are provided with perforated seed-slides F and perforated bottoms $a$, arranged in the usual way, and the slides F have a reciprocating motion given them by means of a lever, G, which is secured by a fulcrum-pin, $b$, to one side of the frame A, and is vibrated by a zigzag cam, H, at the outer side of the outermost roller B, the slides F being connected to the ends of the lever G. The front seed-box, D, is designed for grass-seeds and the back box, E, for grain.

I represents metallic frames, the front ends of which are fitted loosely on the axle C, between the rollers B, and at the back part of each frame I there is a coverer, J, of hoe-shape. The frames I and coverers J may be struck out of a single piece of metal, the arms $a^x$ of the frames being bent parallel with each other and fitted one at each side of each roller, as shown clearly in Fig. 2. The upper parts of the coverers J have each a cord or chain, $b^x$, attached, and the upper ends of these cords or chains are attached to a crank-shaft, K, at the back part of the frame A, so that by elevating or turning said shaft K the coverers J may all be simultaneously raised or elevated above the surface of the ground. In consequence of constructing the frames I and fitting them on the axle C, as described, there will be a coverer, J, behind each roller B.

The operation is as follows: The boxes D E are supplied with the requisite seeds, and as the machine is drawn along the slides F F have a reciprocating motion communicated to them through the medium of the lever G and zigzag cam H, and the seed is rolled into the ground by the rollers B, which crush the clods and pulverize the earth, and at the same time form furrows to receive the grain discharged from the box E, the grain from the latter falling directly in front of the coverer J, as indicated in red, Fig. 1. The coverers J cover the grain which falls from the box E.

This device, it will be seen, is perfectly simple and efficient, and it leaves the ground in a good state or in a condition favorable for the germination of the seed and the subsequent growth of the crop.

By placing the rollers B loosely on their axle C they operate much more efficiently than if they were connected together, as each roller is allowed to move faster or slower than the ones adjoining it, according to the surface of the ground over which it is passing, or as it may be checked by clods or other obstacles, thereby preventing all clogging.

I do not claim any of the within-described parts separately or in itself considered, irrespective of the arrangement and combination herein described.

I claim, therefore, as new and desire to secure by Letters Patent—

The combination of the rollers B with the seed-boxes D E and coverers J, arranged for joint operation, as and for the purpose set forth.

JOHN S. GAGE.

Witnesses:
D. H. WAGNER,
JOHN E. COLENSO.